United States Patent [19]

Bargsten

[11] 4,376,230

[45] Mar. 8, 1983

[54] CABLE DUCT

[75] Inventor: Günther Bargsten, Hamburg, Fed. Rep. of Germany

[73] Assignee: Licentia Patent-Verwaltungs-GmbH, Frankfurt am Main, Fed. Rep. of Germany

[21] Appl. No.: 281,921

[22] Filed: Jul. 10, 1981

[30] Foreign Application Priority Data

Jul. 10, 1980 [DE] Fed. Rep. of Germany ... 8018534[U]

[51] Int. Cl.³ .............................................. H02G 3/22
[52] U.S. Cl. ......................................... 174/48; 248/56
[58] Field of Search .......................... 174/48, 49, 151; 248/56; 52/232

[56] References Cited

U.S. PATENT DOCUMENTS

| | | | |
|---|---|---|---|
| 2,732,226 | 1/1956 | Brattberg | 248/56 X |
| 3,282,544 | 11/1966 | Brattberg | 248/56 |
| 3,489,440 | 1/1970 | Brattberg | 248/56 X |
| 4,249,353 | 2/1981 | Berry | 248/56 X |
| 4,291,195 | 9/1981 | Blomqvist et al. | 248/56 X |

FOREIGN PATENT DOCUMENTS 1816359  8/1960  Fed. Rep. of Germany .

Primary Examiner—A. T. Grimley
Assistant Examiner—D. A. Tone
Attorney, Agent, or Firm—Spencer & Kaye

[57] ABSTRACT

A cable duct includes a hollow body having a length dimension, open ends, side walls and an end wall structure closing off the open ends. The cables which project through the end wall structure are arranged in at least one layer within the hollow body. The end wall structure comprises a filler material surrounding each layer; parallel spaced support bars positioned within the hollow body along opposite side walls thereof; a transverse bar positioned over each cable layer and extending transversely to the length dimension of the hollow body and between the support bars transversely thereto; and an arrangement for securing opposite ends of the transverse bar to a respective support bar.

9 Claims, 1 Drawing Figure

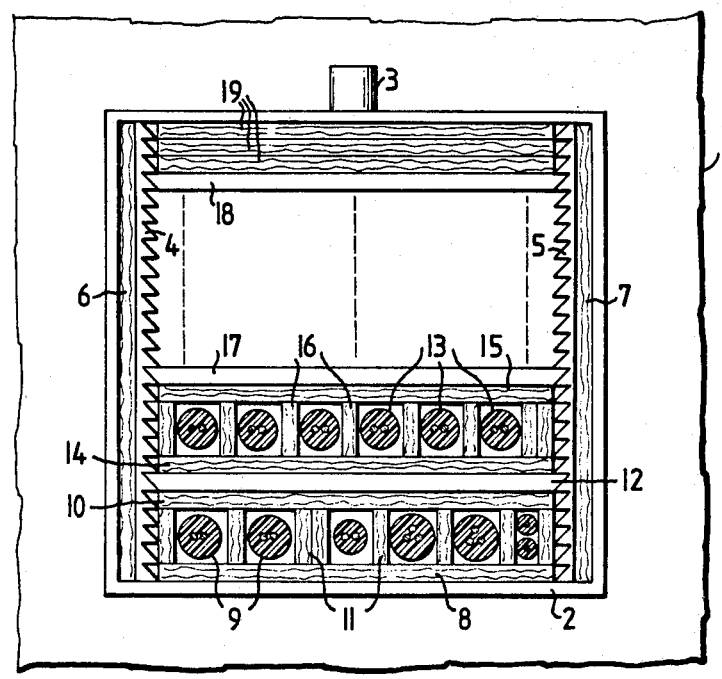

CABLE DUCT

BACKGROUND OF THE INVENTION

This invention relates to a cable duct for guiding cables, conductors and the like through walls, panels or decks. The duct through which the cables pass and which is supported in a wall aperture comprises a hollow body which generally has a finite length, a rectangular cross section and is usually filled with a flowable embedding mass after all the cables have been positioned therein and the duct openings at opposite ends of the duct have been closed.

German Pat. No. 958,671 discloses a fire resistant as well as a watertight and gastight cable duct which comprises a frame designed for receiving bundles of individual cables or conductors. The bundles are positioned in the frame in layers and are placed under pressure by tightening a pressure bolt of a pressing plate which acts on the cable layers with the intermediary of a closure seal.

Further, German Utility Model (Gebrauchsmuster) No. 1,816,359 discloses an arrangement for supporting cables that pass through partitions. The arrangement includes a box which is welded to the partitions and which has at its ends openings that are closed off by rubber or plastic plates provided with bore holes for receiving the conductors or cables. The box-like duct is, after all cables and conductors have been appropriately positioned therein, filled with a flowable embedding mass.

SUMMARY OF THE INVENTION

It is an object of the invention to provide an improved cable duct of the above-outlined type which is simple and inexpensive and which provides a fire-resistant and watertight closure for the cable duct for particular use on board vessels.

This object and others to become apparent as the specification progresses, are accomplished by the invention, according to which, briefly stated, the cable duct includes a hollow body having a length dimension, open ends, side walls and an end wall structure closing off the open ends. The cables which project through the end wall structure are arranged in at least one layer within the hollow body. The end wall structure comprises a filler material surrounding each cable; parallel spaced support bars positioned within the hollow body along opposite side walls thereof; a transverse bar positioned over each cable layer and extending transversely to the length dimension of the hollow body and between the support bars transversely thereto; and an arrangement for securing opposite ends of the transverse bar to a respective support bar.

BRIEF DESCRIPTION OF THE DRAWING

The sole FIGURE is a schematic sectional elevational view of a preferred embodiment of the invention.

DESCRIPTION OF THE PREFERRED EMBODIMENT

Turning now to the FIGURE, in an opening of a wall 1 such as a partition or a ship deck or any other type of wall, there is inserted a hollow metal body 2 of rectangular cross section and of predetermined length. A firm and sealing connection between the hollow body 2 and the wall 1 may be ensured for example, by welding. In case the hollow body 2 is positioned in a vertical wall, on the upper surface of the hollow body 2 there is provided a nipple 3 through which a solidifying embedding mass may be poured.

In the description which follows, the end wall structure to be provided according to the invention at the two opposite ends of the hollow body 2 will be set forth.

Along two opposite inner walls of the hollow body 2, parallel support bars 4 and 5 are provided, immediately at the two open ends of the hollow body 2. The support bars 4 and 5 are resilient towards and away from the wall faces with which they are associated. For this purpose, the support bars 4, 5 are made of a material which is elastic between certain limits or, in the alternative, the bars 4, 5 are supported on resilient (foam) layers 6 and 7 interposed between the bars 4 and 5 and the respective associated wall face of the hollow body 2. The mutually facing surfaces of the bars 4 and 5 have a sawtooth configuration. In the illustrated embodiment the bars 4 and 5 are provided with sawtooth series with downwardly inclined teeth.

For providing end walls that close off the openings at opposite ends of the hollow body 2, first on the inner bottom wall of the hollow body 2 there is provided a filler strip 8 of a solid, absorbent and expandable material on which a row (layer) of cables 9 is positioned. The cable layer is covered with a further filler strip 10 and further, in the clearances between the individual cables 9 there are positioned filler inserts 11. The filler components 10, 11 are of the same material as the filler strip 8. On the top of the filler strip 10 there is positioned a transverse bar 12 which is pushed down on the underlying structure to press thereon, whereupon, in its depressed state of the transverse bar 12, the opposite ends thereof are snapped into the momentarily outwardly yielding support bars 4 and 5 below the appropriate tooth, whereby the transverse bar 12 is firmly held at both of its ends by the support bars 4 and 5.

A subsequent cable or conductor layer 13 is thereafter positioned on the top of the transverse bar 12, between filler strips 14 and 15 and filler inserts 16. Above the second cable layer 13, on the top of the filler strip 15, there is positioned a second transverse bar 17 with which the underlying structure is compressed and then, similarly to the first transverse bar 12, opposite ends of the transverse bar 17 are inserted under appropriate teeth on the support bars 4 and 5. Such a construction is continued at the opposite open ends of the hollow body 2 until all cables are positioned or, as the case may be, all remaining hollow spaces in the end faces are filled. The space which remains between the upper inner wall of the hollow body 2 and the last transverse bar 18 and in which no cable is to be placed, is filled with filler strips 19 of the same material as the filler components described before. It is noted that instead of teeth, the support bars 4, 5 may have a wavy face; the ends of the transverse bars are held between selected two adjacent projections of the wavy configuration.

After forming of the end wall structures as described above has been completed for the two ends of the hollow body 2, the outwardly exposed faces of the filler components are wetted by a liquid. As a result, the filler material expands and securely closes off all hollow spaces which remain between the cables. It is expedient to use a liquid which, in addition to an expansion effect, strengthens the filler material. After a certain hardening period, a flowable mass may be poured into the hollow body 2 through the nipple 3 to completely fill the hollow body 2.

Instead of an absorbent and expandable material in which the individual cable layers are embedded within the hollow body 2, rock wool may be used as the filler material.

Even if rock wool is used about the cables, it is expedient to treat the end faces of the hollow body with a hardening liquid prior to introducing a flowable embedding material to fill out the inside of the hollow body. In this manner small residual openings in the end faces of the hollow body are closed and thus the flowable mass subsequently introduced is prevented from escaping through the end faces.

The filler components 8, 10, 11 and 19 could consist of a viscose material which expands after being moistened with a liquid. For this purpose it is preferable to use a liquid that also makes the viscose material fire resistant, for example silica sol.

The support bars 4 and 5 can be made either of metal strips with beading or of PVC or similar plastic material.

If rock wool is used as the filler material, the surface of the front wall could be sealed with a fire resistant dispersion paint.

To fill the voids after the build-up of the front walls, an inorganic two-component sealing compound can be used, for example the Sealing Compound E 795 produced and distributed by AEG-TELEFUNKEN AKTIENGESELLSCHAFT.

The resilient layers 6 and 7 interposed between the supporting bars 4 and 5 and the respective associated wall face of the hollow body could be formed from double-sided adhesive foam ribbon.

It will be understood that the above description of the present invention is susceptible to various modifications, changes and adaptations, and the same are intended to be comprehended within the meaning and range of equivalents of the appended claims.

What is claimed is:

1. In a cable duct for leading cables through a wall; said cable duct including a rectangular hollow body having a predetermined length and opposite open ends and an embedding mass filling the hollow body about the cables passing therethrough; the improvement wherein said cables are arranged as at least one cable layer embedded in an absorbent and expandable filler material in the zone of said ends; further comprising support bars arranged within said hollow body along two opposite walls thereof in the zone of said ends; a transverse bar positioned over each said cable layer in the zone of said ends and extending transversely to the length dimension of said hollow body and said support bars; each said transverse bar having ends projecting into respective said support bars.

2. In a cable duct for accommodating cables, including a hollow body having a length dimension, an open end, side walls and an end wall structure closing off said open end; said cables projecting through said end wall structure; the improvement wherein said cables are arranged as at least one cable layer, and further wherein said end wall structure comprises
    (a) a filler material surrounding each said cable layer;
    (b) spaced support bars positioned within said hollow body along opposite side walls thereof;
    (c) a transverse bar positioned over each said cable layer and extending transversely to the length dimension of said hollow body and between said support bars transversely thereto; and
    (d) securing means for attaching opposite ends of said transverse bar to a respective said support bar.

3. A cable duct as defined in claim 2, wherein said hollow body has a rectangular cross section.

4. A cable duct as defined in claim 2, wherein said hollow body has a predetermined length and two opposite open ends; a separate one of said end wall structure being provided at both said ends as a closure therefor.

5. A cable duct as defined in claim 4, wherein said hollow body is filled with an embedding material between the two end wall structures.

6. A cable duct as defined in claim 2, wherein said filler material is absorbent and expandable upon contact with liquid.

7. A cable duct as defined in claim 1 or 2, further comprising an elastically compressible member positioned between each said support bar and the respective wall adjacent thereto.

8. A cable duct as defined in claim 1 or 2, wherein said support bars are of an elastic material, whereby said support bars are resiliently deformable towards the respective wall adjacent thereto.

9. A cable duct as defined in claim 2, wherein said securing means comprises a series of teeth provided on said support bars along the length thereof; said teeth being oriented towards said transverse bar; said transverse bar having ends fitting between two selected adjoining teeth on each said support bar.

* * * * *